Aug. 3, 1943.                J. A. HANLEY                2,325,606
                          SHAVING IMPLEMENT
                        Filed July 26, 1940            2 Sheets-Sheet 1
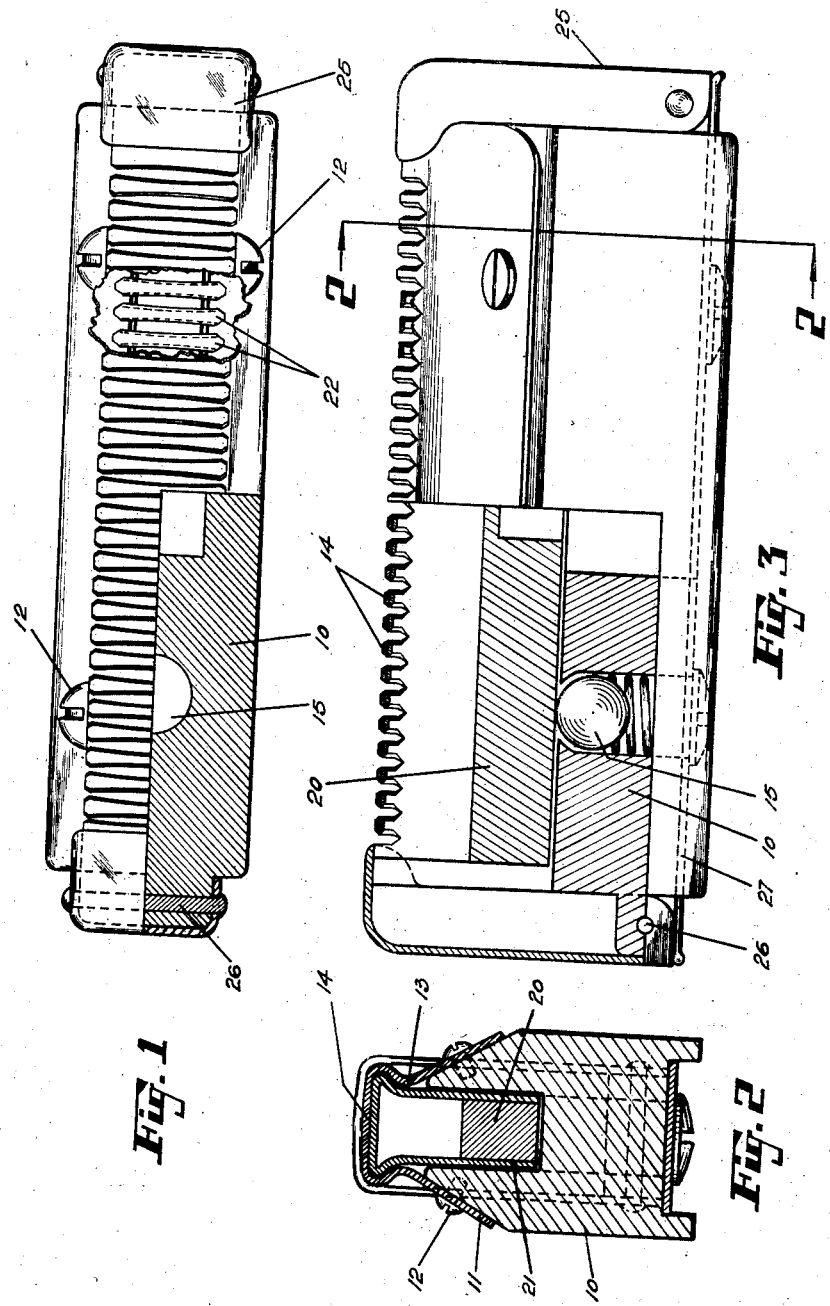
INVENTOR.
BY John A. Hanley Aug. 3, 1943.   J. A. HANLEY   2,325,606
SHAVING IMPLEMENT
Filed July 26, 1940   2 Sheets-Sheet 2
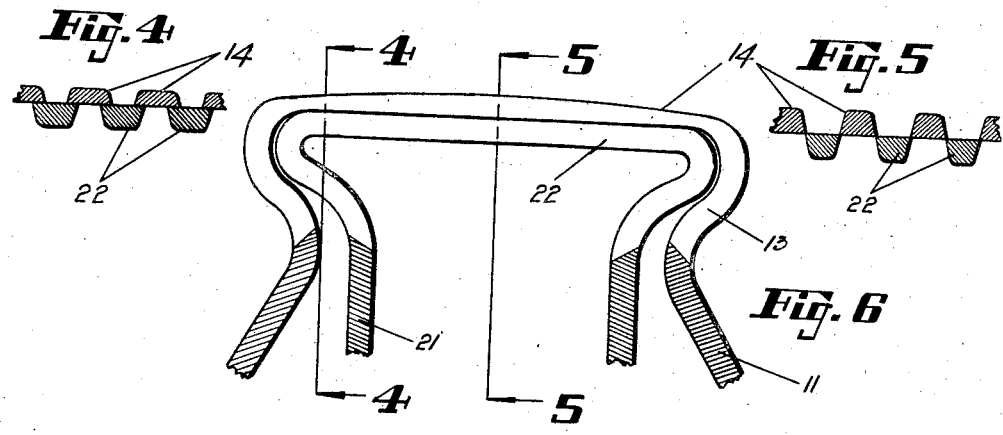
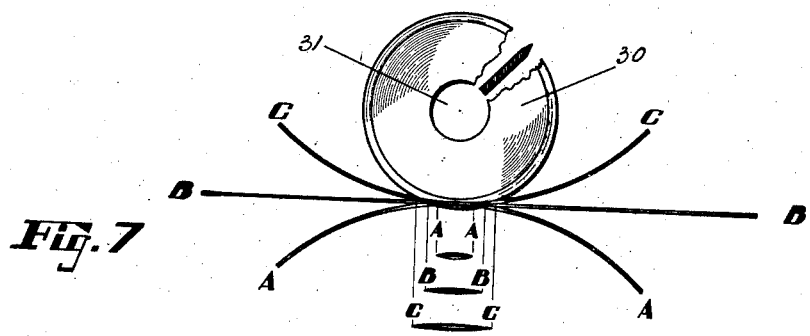
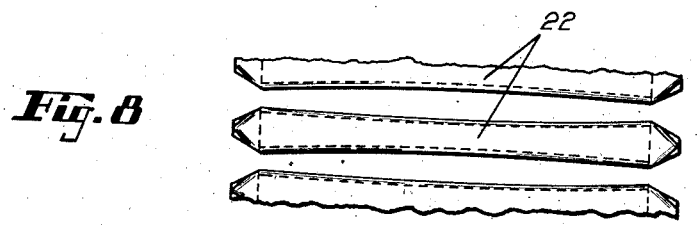
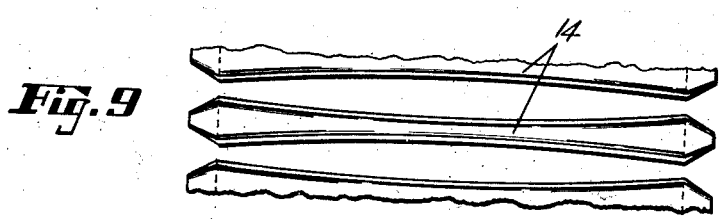
INVENTOR.
John A. Hanley
BY Patented Aug. 3, 1943

2,325,606

UNITED STATES PATENT OFFICE 2,325,606

SHAVING IMPLEMENT

John A. Hanley, Noroton, Conn., assignor to Gillette Safety Razor Company, Boston, Mass., a corporation of Delaware Application July 26, 1940, Serial No. 347,811

7 Claims. (Cl. 30—43)

This invention relates to implements of the vibratory shear type employed for shaving without the use of lather. The general objects of my invention are to improve the shaving efficiency and to provide a simplified dry shaver construction which may be manufactured practicably with accuracy and with moderate expense.

Shaving implements of this type as heretofore constructed have included an outer cutter and sometimes an inner cutter fashioned from a solid block of steel and including shearing teeth formed by a series of slots not over .008" to .012" in width. The problem of forming such narrow slots accurately in solid steel is one of extreme difficulty involving much manufacturing waste and high production cost. These difficulties I avoid in accordance with the present invention by employing sheet steel, preferably hard stainless sheet steel, as a material for the cutters. I have discovered that it is practical to cut by milling or otherwise a series of slots in a sheet steel blank and then to bend the slotted blank so as to produce a cutter of stiff cross-section. The slot milling cutter or gang of such cutters may be employed to form a series of transverse slots of accurately controlled length, width and location and of a formation resulting in several important functional advantages. For example, the slots may be milled with disk cutters having an included edge angle of 25° or thereabouts and instead of carrying the milling cutter entirely through the sheet steel blank, it may be moved only to carry the slot through the lower face of the blank in a limited area, leaving the sides of the slot with the shear angle of the milling cutter and the ends of the slot with a shear angle determined by the edge curvature of the milling cutter. Moreover, the slots so formed and the resulting shearing teeth do not have parallel edges. The slots may taper both ways from the longitudinal axis of the cutter toward its edge so that the slot may be, for example, .010" or .012" in width at the center and not more than .007" or .008" in width at its extremity. The shearing edges may be curved instead of straight and when these are associated with correspondingly but reversely curved shearing teeth formed in the movable cutter the result is a true shearing action between oppositely curving shearing edges.

The milling procedure above outlined lends itself advantageously to the slotting of a sheet steel blank which need not be of uniform thickness but may taper slightly both ways from a central longitudinal axis of maximum thickness, for example, of approximately .007" or .008" to an end thickness of .003" or .004". Where such a blank is employed the milled slots will be found to decrease progressively both in width and depth as they approach the sides of the cutter. It will be apparent that by the procedure outlined the length, width, shape and location of the transverse slots may be correspondingly controlled by the shape of the milling cutters and the position of the sheet metal blank being operated upon. For example, if it is desired to increase or decrease the length of the slots without changing the width of the opening or characteristic shape in them the blank may be supported in a slightly concaved or slightly convex position and the length of the slot thus varied.

Having slotted the flat blanks as above outlined these may be bent into the particular shape required of the cutters and important functional advantages are secured with no sacrifice of manufacturing simplicity. The edge portions of the outer cutter blank are bent downwardly along lines such that a series of inwardly converging hair passages are provided in each edge of the cutter and moreover these passages extend freely and without obstruction from side to side of the cutter so that the hairs to be shaved may enter freely and pass without obstruction to the shaving zone. In bending the sheet metal blank for the outer cutter the material of the shearing teeth, being of substantial thickness, is widened to some extent along the inner curve of the fold or bend, whereas the material is narrowed in the outer curve of the fold line. Thus a series of inwardly converging or funnel-shape hair-receiving openings is provided which is outside the shearing zone and in which the side shearing surfaces converge downwardly forming acute angles with the inner face of the cutter. Preferably and as herein shown the cutter is provided with a waist portion of reduced width adjacent to the line of the fold or bent edge of the cutter.

The sheet steel blank of the inner cutter is formed in an opposite sense from that of the outer cutter, that is to say, the walls of the slots diverge downwardly. The cutter blank is also bent in the opposite sense from the stationary cutter, that is to say, its sides are bent inwardly so that the minimum width of the slots is presented in contact with the inner face of the stationary cutter.

A very important feature of my invention consists in a combination of cutters which are effective throughout practically their entire transverse width and not merely in a restricted central zone. As herein shown the body of the outer cutter flares outwardly from its dimension of minimum width and merges into a stationary shearing surface having slots extending from side to side. When the side portions of the inner cutter are folded the material of the blank tends to close along the edges of the cutter and it is accordingly desirable to open the curved ends of the cutter teeth by a grinding or lapping operation. In this way the outer edge of each movable shearing tooth may be reduced to substantially the width of a hair so that there is no obstruction from the moving shearing teeth to the entrance of hairs between the stationary shearing teeth. These characteristics increase the efficiency of the implement of my invention and distinguish it from those heretofore known where wide or square shearing teeth have masked the hair passages of the stationary cutter throughout an appreciable portion of the cycle.

Preferably and as herein shown the inner reciprocatory cutter is made to conform in contour to the stationary cutter. The inner cutter has a reduced waist portion and slotted diverging side portions which fill the stationary cutter and provide a shearing zone of the full width of the cutter, that is to say, one extending transversely to the hair-collecting and directing points of the stationary cutter.

An important advantage of my novel construction is that it permits employing a simple and inexpensive holder for the cutters, for example, a holder of die-cast metal. Moreover, the construction is such that the cutting area is practically co-extensive with the whole face-engaging area of the implement. Substantially the whole length of the outside cutter slots is effective in the shearing operation. In other words, little or none of the length of the tooth-forming slots is wasted in guiding the hairs into the shearing position, but on the contrary the shearing zone extends substantially to the side edges of the cutter, so that the hairs are cut instantly when reached by the implement without any obstruction. The long hairs accordingly tend to fall outside the implement thus obviating any tendency to clog the moving parts. On this account the cutter is equally efficient when dealing with long hair as with short stubble.

These and other features of the invention will be best understood and appreciated from the following description of a preferred embodiment thereof, selected for purposes of illustration and shown in the accompanying drawings, in which:

Fig. 1 is a plan view of the implement, showing a quarter section and a portion broken out of the outer cutter;

Fig. 2 is a cross-sectional view on the line 2—2 of Fig. 3;

Fig. 3 is a view in elevation showing the same quarter section as Fig. 1;

Figs. 4 and 5 are longitudinal sectional views of the cutter teeth on the lines 4—4 and 5—5 respectively of Fig. 6;

Fig. 6 is a sectional view of the two cutters on a greatly enlarged scale;

Fig. 7 is a diagrammatic view illustrating the slotting operation upon the sheet steel blank of the cutters;

Fig. 8 is a fragmentary plan view on an enlarged scale of the shearing teeth of the inner cutter; and Fig. 9 is a similar view of the teeth of the outer cutter.

In the drawings the cutter head only of the implement is shown and it will be understood that this is to be mounted in a conventional housing and that the inner cutter is reciprocated at a high rate of speed by a small motor contained within the housing.

The cutter head comprises an elongated steel block 10 of rectangular outline, having the upper part of its side faces converging inwardly and an open channel formed in its upper portion. The outer cutter is formed from a blank of hard stainless sheet steel and has inwardly converging side walls 11 which are secured by screws 12 to the convergent side faces of the block 10. The side walls of the cutter itself converge to a narrow waist 13 which is located above the side faces of the block 10 and which forms a longitudinal channel of stiff cross-section in each side of the cutter. From this waist the side walls of the outer cutter diverge outwardly and upwardly and finally merge through a curve of small radius into the skin-engaging portion of the cutter. Transverse slots are formed in the flat blank before the outer cutter is bent to final shape and these slots form transverse shearing teeth 14 shown on an enlarged scale in Fig. 9. The walls of the slots are dished upwardly, or in other words, they converge in both directions from the central longitudinal axis of the cutter where their maximum width is .010″ or .012″. At their extremities they need be not more than .007″ or .003″ in width. The side walls of the slots as already noted are not vertical but converge downwardly so that each slot is of minimum dimensions at the lower surface of the sheet in which it is formed. After the blank has been slotted in the manner just explained its side portions are bent downwardly to form the side walls of the cutter already described as to shape. In this bending operation the fold line or vertex line intersects all the slots and the material of the teeth between the slots tends to thicken along the vertex so that the walls of the slots are still further pinched together at their points. On the other hand, the downturned slotted portions of the blank tend to increase the width of the slots at the outer curve of the bend. As well shown in Fig. 6 the slots extend downwardly into the side walls of the outer cutter substantially to the waist portion thereof and thus free and unobstructed passages are afforded for hairs in reaching the shaving zone of the implement.

As herein shown the walls of the slots forming the teeth 14 of the stationary cutter are bowed outwardly at the center and converge in arcs of long radius toward the opposite sides of the cutter. The stationary teeth of the outer cutter therefore have a double shear angle, that is to say, an angle caused by the bowed configuration of the teeth and an angle caused by the downward convergence of the walls of the teeth.

The blank for the outer cutter is reduced in thickness in its marginal portions after it has been formed and is thus somewhat thicker in its longitudinal axis than at its edges. Consequently the shearing teeth taper both ways from the center or longitudinal axis of the skin-engaging area. It follows, therefore, that the teeth increase in width toward the edges of the implement in proportion as they decrease in depth or height. As shown in Fig. 4 the section of each tooth 14 at the marginal section line 4—4 is relatively wide and shallow, whereas the dimensions of the same tooth on the section line 5—5 at the center of the implement is relatively deep and narrow. This results in an equalized intrusion of the skin of the user between the teeth.

It enters more readily between the teeth where the latter are widely separated as shown in Fig. 5 than between the more closely arranged shallow teeth in the position of Fig. 4, but in the position of Fig. 5, the skin must bulge inwardly for a greater distance in order to establish the same relation with the shaving plane that it does in the position of Fig. 4.

The inner cutter is contained within the outer cutter and is guided for reciprocatory movement in the channel of the block 10. This cutter like the outer cutter is formed from a blank of hard, stainless sheet steel, bent to the shape corresponding to the interior shape of the outer cutter and firmly secured to the rectangular steel block 20. The inner cutter has parallel side walls 21 which flare outwardly above the waist 12 of the outer cutter into conformity with the shape thereof and then merge in a flat transversely slotted area in which the shearing teeth are formed. The shape of the slots and shearing teeth 22 of the inner cutter is best shown in Fig. 8 from which it will be seen that the slots forming these teeth are bowed from end to end so that the walls converge from a maximum width at the longitudinal axis of the cutter to a minimum width at its ends. The walls of the slots are not vertical but diverge downwardly. In other words, the walls of the slots are dished downwardly in the inner cutter while the walls of the slots are dished upwardly in the outer cutter. In the case of the inner cutter the flat blank is slotted and then bent in lines intersecting the slots to form the side walls of the cutter but in this instance the bending takes place away from the face of the blank where the slots are narrowest so there is a tendency to close the side wall slots instead of to open them. To overcome this tendency the inner cutter is subjected to a lapping operation which points the material at the ends of the shearing teeth and provides diverging guiding faces for directing the hairs into the slots between the shearing teeth. In this operation the ends of the shearing teeth are reduced to substantially the width of a hair so that they never constitute an appreciable obstruction to the entrance of hairs to the shaving zone in any position. The effect of this is to increase the open time of the shearing teeth and thus improve the efficiency and capacity of the implement.

The shearing teeth of the respective cutters may be fashioned in any desired manner but as herein shown I propose to form them by milling transverse slots with a circular milling cutter 30 similar to that shown in Fig. 7. The milling cutter 30 may be used individually or a gang of similar cutters may be employed simultaneously. The cutter is shown as mounted upon an arbor 31 and as having an included edge angle of about 25°. The bevel of the milling cutter edge being somewhat deeper than the thickness of the blank to be slotted.

In operating upon the blank B, shown in Fig. 7 as being maintained in a flat condition, the milling cutter 30 is advanced until it breaks through the bottom surface of the blank but not beyond its edge bevel. It thus produces the slot B—B with the dished side walls. A minimum opening at the lower surface is shown in Fig. 7. If it is desired to increase the length of the slot without otherwise affecting its dimensions, the blank may be curved into some such position as the blank C of Fig. 7 and under such conditions longer slots C—C will be produced. On the other hand, if the blank is curved into convex position as is the blank A the length of the resulting slots is correspondingly reduced and a shorter slot A—A is produced. The method above outlined is convenient, desirable and novel and has the advantage of adjustably controlled slot dimensions.

In the assembled implement the block 20 of the inner cutter is supported by a pair of spring-pressed balls 13 mounted in suitable sockets in the block 10. These act to maintain the two shearing faces of the cutters in yielding engagement at all times while still permitting free reciprocation of the inner cutter.

The channel through the head of the implement is closed at each end by a cap 25 pivotally mounted upon a transverse pin projecting through a lug at each end of the block 10. The caps 25 are curved at their upper corners and thus furnish guards for the corners of the head of the implement. They also serve to close the ends of the channel and retain the sheared stubble and other shaving debris within the implement during the shaving operation. A leaf spring 27 engages the bottom edge of each cap 25 and tends to hold it either in closed or open position. The spring 27 is narrower than the block 10 and lies in a wide shallow channel provided in the bottom of the block for the spring and the heads of the screws that fasten it in place.

Having thus disclosed my invention and explained an illustrative embodiment thereof, I claim as new and desire to secure by Letters Patent:

1. A shaving implement comprising a head having upwardly converging side faces, a stationary sheet metal cutter conformed thereto with side walls converging and then flaring outwardly above said converging faces in reentrant angles and having a central face with transverse shearing teeth therein, and a movable cutter contained within the stationary cutter and having side walls carrying a slotted outwardly flaring portion conforming to the flaring portion of the stationary cutter.

2. A shaving implement comprising an outer stationary cutter of sheet metal having side walls which converge to a narrow waist portion and then diverge, thus forming longitudinal channels of stiff cross-section in the sides of the cutter, and merge into a transversely slotted shearing face which is wider than the waist portion, and a movable cutter having divergent side portions and a transversely slotted shearing face.

3. A shaving implement comprising an outer stationary cutter of sheet metal having side walls which converge to a narrow waist portion, then diverge, thus forming longitudinal channels of stiff cross-section in the sides of the cutter, and finally turn inwardly to form the skin-engaging face of the implement, the stationary cutter being transversely slotted by open-ended slots that extend down substantially to the divergent walls thereof, and a movable cutter conforming in shape to the slotted portions of the stationary cutter.

4. In a shaving implement, an elongated cutter of sheet metal which tapers in thickness both ways from a thick central longitudinal zone and has transverse slots therein converging in width toward the opposite sides of the cutter, the slots thus decreasing progressively both in width and depth as they approach the sides of the cutter.

5. A shaving implement having an elongated outer cutter of sheet steel having transverse slots providing shearing teeth with inwardly diverging sides, the marginal portions of the cutter being bent across the ends of the teeth to provide inwardly diverging supporting walls for the shearing area, and a movable cutter having transverse slots providing teeth with upwardly converging sides, the marginal portions of the cutter being bent on a line extending across the ends of its teeth to provide supporting walls for its shearing area.

6. A shaving implement comprising an outer elongated cutter of sheet steel having a series of transverse slots forming teeth therein which have shearing edges bowed apart from end to end and curved faces which diverge outwardly from said shearing edges, and an inner movable cutter of sheet steel having a series of transverse slots forming teeth therein which have shearing edges also bowed apart from end to end and curved faces which diverge inwardly from said shearing edges.

7. A shaving implement comprising an outer elongated cutter of sheet steel having a series of transverse slots forming teeth therein which have shearing edges bowed apart from end to end and curved faces which diverge outwardly from said shearing edges, the marginal portions of the cutter being folded at acute angles to the intermediate portion of the cutter on parallel lines which intersect the slots within their outer ends, and an inner movable cutter of sheet steel having a series of transverse slots forming teeth therein which have shearing edges also bowed apart from end to end and curved faces which diverge inwardly from said shearing edge, the marginal portions of the inner cutter being folded at acute angles to the intermediate portion of the inner cutter on parallel lines which intersect the slots within their outer ends.

JOHN A. HANLEY.